United States Patent [19]

Webb

[11] Patent Number: 4,601,495
[45] Date of Patent: * Jul. 22, 1986

[54] PIPELINE SYSTEM AND METHOD OF ASSEMBLY

[75] Inventor: Maurice J. Webb, Mountain Lakes, N.J.

[73] Assignee: Victaulic Company of America, South Plainfield, N.J.

[ * ] Notice: The portion of the term of this patent subsequent to Jun. 11, 2002 has been disclaimed.

[21] Appl. No.: 742,719

[22] Filed: Jun. 7, 1985

Related U.S. Application Data

[63] Continuation of Ser. No. 371,438, Apr. 23, 1982, Pat. No. 4,522,434.

[51] Int. Cl.$^4$ ............................................. F16L 17/04
[52] U.S. Cl. ...................... 285/112; 285/368; 285/373; 285/423; 29/428
[58] Field of Search .............. 285/112, 373, 423, 368; 29/428

[56] References Cited

U.S. PATENT DOCUMENTS

| | | |
|---|---|---|
| 332,035 | 12/1885 | Bogaley . |
| 2,225,208 | 12/1940 | Crickmer ........................ 285/112 X |
| 2,508,914 | 5/1950 | Graham .......................... 285/112 X |
| 2,944,839 | 7/1960 | Anderson ........................ 285/112 X |
| 3,003,793 | 10/1961 | Pitt ................................... 285/112 |
| 3,495,853 | 2/1970 | Furrer ............................. 285/373 X |
| 3,687,487 | 8/1972 | Lindholm . |
| 3,756,629 | 9/1973 | Gibb ................................. 285/112 |
| 3,776,575 | 12/1973 | Gale . |
| 3,796,194 | 2/1974 | Kimberley ....................... 285/373 |
| 4,039,210 | 8/1977 | Wood . |
| 4,097,070 | 6/1978 | Alda ................................. 285/112 X |
| 4,176,865 | 12/1979 | Felton . |
| 4,248,460 | 2/1981 | Murray . |
| 4,310,183 | 1/1982 | Szalvay . |
| 4,408,788 | 10/1983 | Beukema ........................ 285/112 X |

FOREIGN PATENT DOCUMENTS

| | | | |
|---|---|---|---|
| 458441 | 12/1936 | United Kingdom ................ 285/112 |
| 871092 | 6/1961 | United Kingdom ................ 285/112 |

Primary Examiner—Dave W. Arola
Attorney, Agent, or Firm—Abelman Frayne Rezac & Schwab

[57] ABSTRACT

A method of assembling a pipeline system and the pipeline system resulting therefrom involves providing pipes and associated conduit members with plural axially spaced key engagement members adjacent the ends thereof, and securing adjacent ends of the pipes and conduit members to each other using segmented couplings having plural axially spaced keys corresponding with the key engagement members, the engagement surfaces of the keys having an inversely pebbled surface produced in the casting of the segments of the coupling and which is intentionally left unfinished, such that pressurization of the pipeline system and the axial loading produced thereby will cause the inversely pebbled surfaces of the respective keys to crush down and cold work the engaged faces of the engagement members to progressively produce substantially uniform stress distribution between the respective keys and engagement members.

10 Claims, 14 Drawing Figures

PIPELINE SYSTEM AND METHOD OF ASSEMBLY

This application is a continuation of application Ser. No. 371,438, filed Apr. 23, 1982 by Maurice John Webb, issued as U.S. Pat. No. 4,522,434 on June 11, 1985, the entire disclosure of that application being included in the present application.

In the said U.S. Pat. No. 4,522,434, there is disclosed and claimed a segmented coupling having particular application in the assembly of pipelines for conveying fluids. The present invention relates specifically to the method of assembling such a pipeline assembly using the coupling of said U.S. Pat. No. 4,522,434, and to a pipeline assembly resulting from the method of the present invention.

Such pipeline assemblies typically include various conduit members used in association with pipes, such as elbows, bends, T-branches, Y-connectors and the like, in order to provide a pipeline assembly of the required configuration.

Segmented couplings are known in the art, and are described in U.S. Pat. No. 3,054,629 to Piatek, issued Sept. 18, 1962. Such couplings have been widely accepted, but have been limited in their use to relatively low to moderate pressure environments.

Typically, such segmented couplings comprise coupling members of arcuate, segmented, usually semi-circular configuration which are employed to bridge the mutually presented ends of a pair of pipes and prevent separation of the pipe ends relatively to each other. The segmented couplings engage the outer periphery of the pipes and are clamped together using any convenient arrangement of fastening members such as bolts and nuts. The coupling segments extend to a continuous ring encircling the pipe ends, and thus provide the required positive clamping engagement between the coupling segments and the pipe ends.

In order to prevent leakage of pressurized fluid from between the two pipe ends some form of seal is used, such as a gasket member of a material suitable for use in its intended environment. The gasket member is positioned over the pipe ends and is maintained in position by the coupling segments. In these constructions, the coupling segments are usually each provided with a recess within which the gasket member is received, the gasket member being held in sealing contact against the outer surface of the pipe ends by the clamping containment produced by the coupling segments.

BACKGROUND OF THE INVENTION

A significant advantage in employing segmented couplings is the ability to quickly assemble pipeline systems on-site. In numerous industrial applications, such as in the gas and oil recovery industries, a particular need arises in the on-site rapid assembly of pipeline systems. It is desirable that such pipeline systems be assembled with maximum economy in labor and materials. Because of the relatively high pressures encountered in such pipeline systems (which for the oil recovery industry commonly are of the order of 4,000 lbs. per square inch or higher) resort has heretofore been made to relatively expensive high-pressure couplings, such as those which require connecting nipples to be welded to the ends of the respective pipes prior to the assembly of the coupling. Such welding operation is undesirable in that the manufacturing operation is performed at a manufacturing plant prior to delivery of the pipes to the assembly site, and represents an increase in cost.

A major problem which has heretofore precluded the use of segmented couplings in high-pressure environments is that of providing adequate inter-engagement of the couplings and the respective pipes, while at the same time maintaining the strength and integrity of the pipes sufficiently high for them to withstand the pressures and forces to which the pipeline system is to be subjected. Segmented couplings require a positive inter-engagement between the coupling segments and the pipes. One typical way of providing this has been by providing a groove adjacent to the pipe end, and, by providing a complementary key on the inner periphery of the coupling segments, such that the coupling segments, when assembled onto the pipe end, are physically keyed into the body of the pipe.

In some industries, where grooving is not possible or desirable, the pipe end is provided with a collar, or with a beaded or raised surface or studs which engage the complementary keys of the coupling.

Such arrangements are admirable in their performance in relatively moderate-pressure applications, but are often times found wanting in high-pressure applications in view of considerations which arise in such high-pressure applications.

While it is possible to form the coupling segments of sufficient strength to withstand the forces exerted on the coupling when in use, problems are encountered in eliminating deformation and fatigue fracture of the pipe itself, which may result in the ultimate total failure of the joint.

These problems arise in part from the desire to employ standard piping which, depending upon the industry and end use, vary from plastic to steel. Such materials when exposed to high pressure are inherently capable of deformation when subjected to stresses at or approaching their elastic limits. While this problem could be alleviated by the use of piping formed from exotic high strength materials, this is not generally economically feasible.

The problems are further aggravated by the necessity of providing a groove or bead, or studding adjacent the end of the pipe for the reception of the key on the coupling. Where grooves are provided, the suggestion has been made to deepen them to provide a greater engagement for the coupling keys, however, this results in a consequential reduction of the available cross-sectional area of the pipe at the location of the groove and the resultant weakening of the pipe at that location. A common point of failure of such joints is between the grooved portion of the pipe and the pipe end, which elastically deforms radially inwards thereby allowing the key to disengage the groove. This produces a wedging or camming action between the groove wall or the bead or the studs and the key which further aggravates the problem. A circumferential collar or bead, or single row of studding adjacent each pipe end similarly provides an insufficient anchor for the coupling when subjected to high pressures.

When grooved pipe is employed, attempts to minimize the depth of the groove, with a consequential increase in the cross-sectional area of the pipe at the location of the groove, result in turn in a corresponding decrease in the surface area of the groove side wall which is available for contact by the key of the coupling. The consequential increase in the stresses between the key and the pipe, again increase the tendency of the material of the pipe to deform at that location under the stresses encountered.

SUMMARY OF THE INVENTION

According to the present invention, the problems discussed above are mitagated to an extent permitting segmented couplings to be used in high-pressure applications by providing plural keys on the coupling segments at positions spaced axially thereof and by intentionally forming the operative surface of each key with a textured surface in the form of inverse pebbling. The respective arrangements perferably provides a total surface area for contact by the engagement members on the pipe which exceeds the surface area heretofore available in single contact members. The present invention permits the radial extent of the respective keys to be decreased, and in embodiments employing grooves in the pipe wall, the wall-thickness of the pipe at the location of the grooves can be correspondingly increased. This results in an increase in the minimum cross-sectional area of the pipe at any point longitudinally thereof, with an increase in the strength of the grooved pipe and an optimized distribution of the stresses exerted on the pipe and the coupling.

The present invention provides segmented couplings usable at pressures well above those ordinarily expected for segmented couplings. In at least one application a grooved pipe and coupling arrangement, normally usable with a single key at pressures up to 2,000 lbs. per square inch, successfully withstood testing at pressures of at least 4,000 lbs. per square inch, and has been bench tested at pressures of up to 12,000 lbs. per square inch before failing.

Accordingly, the present invention teaches a coupling segment for use with at least one additional coupling segment to provide a segmented coupling for a pipe, each of the segments comprising a body member adapted to contain a sealing means and having an axially extending surface for positioning around a portion of a pipe, and having means thereon for coaction with securing means for securing said coupling segment to at least one other coupling segment in encircling relationship with said pipe, the coupling segment further including at least one key carrying portion having a surface for positioning around a portion of said pipe, and plural keys extending from said surface of said key carrying portion towards said pipe at positions spaced axially along said surface, each key extending towards said pipe and having a radially extending inversely pebbled engagement face adapted for engagement with an abutment associated with said pipe.

DESCRIPTION OF THE DRAWINGS

The invention will now be described with reference to the accompanying drawings, which illustrate preferred embodiments of the present invention, and in which:

FIGS. 1 through 6 of the drawings each relate to embodiments of the invention to be employed with grooved pipe.

Figure 1:
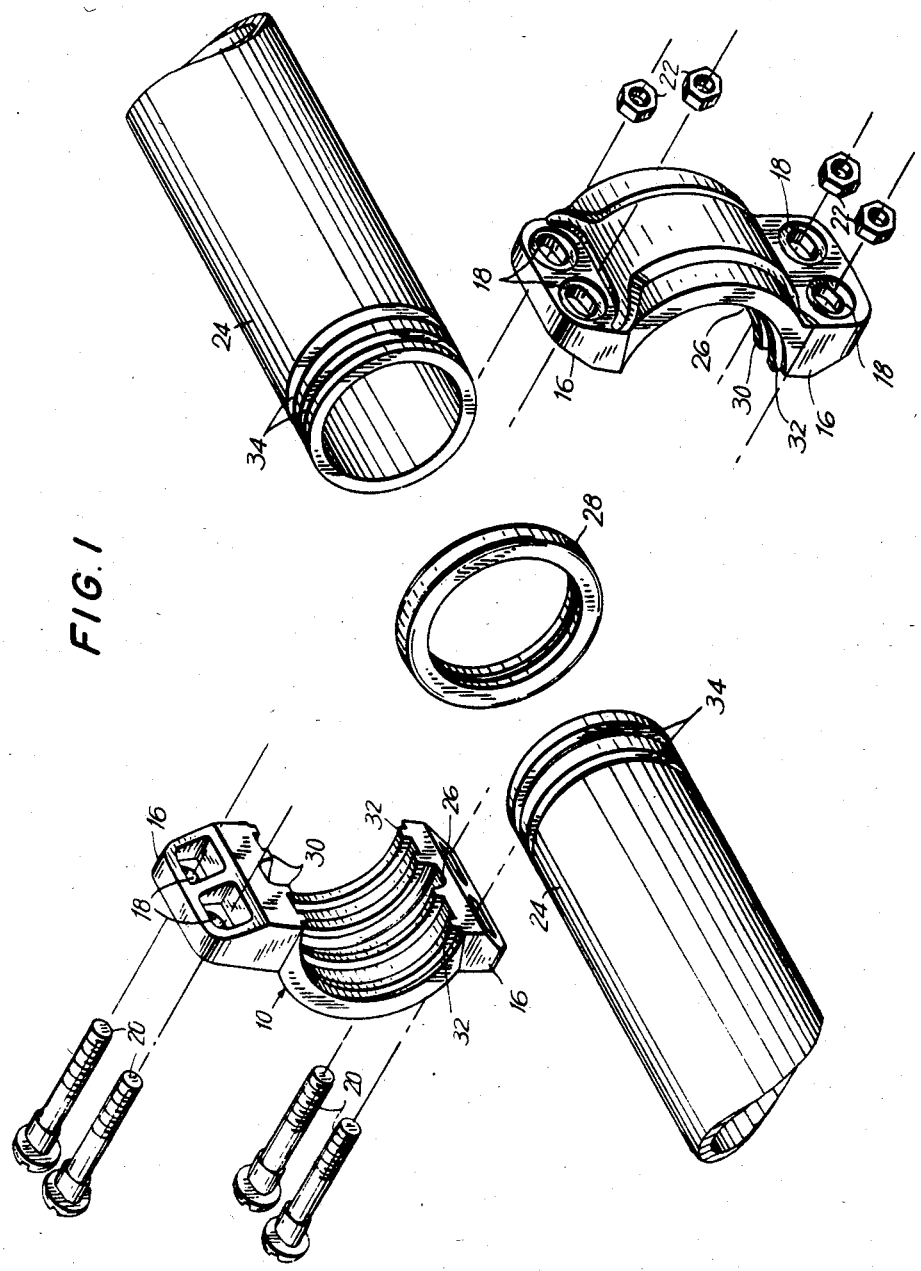
FIG. 1 is an exploded perspective view of a segmented coupling of the present invention shown in association with a gasket to be employed therewith and the grooved ends of a pair of pipes to be connected to each other by the coupling.

Referring more particularly to FIG. 1 of the drawings, a segmented coupling is illustrated in disassembled condition, the respective coupling segments being indicated at 10 and 12. The coupling segments are identical with each other, and are substantially semi-circular in form, each coupling member half being comprised by an arcuate body portion 14 which terminates at its ends in radially outwardly extending bolting pads 16 formed integrally with the body portion 14.

Each of the radially outwardly extending bolting pads 16 includes apertures 18 for the reception of fastening members, which, in the drawings, are shown as headed bolts 20. When in an assembled condition, the respective coupling segments 10 and 12 are secured to each other in encircling relationship with the pipe ends by the headed bolts 20 and conventional nuts or lock nuts 22 threadedly received on the bolts.

Internally of each coupling segment half 10 and 12 and intermediate the axial length thereof in the embodiment illustrated, is a recess 26 in which a gasket 28 is accommodated, the gasket 28 being employed to seal the pipes 24 when the coupling is in an assembled condition and prevent leakage.

Located immediately adjacent the recess 26 in each coupling segment is an axially inner key 30 formed integrally with the coupling segment, and, spaced from each of the axially inner keys 30 are axially outer keys 32, which similarly are formed integrally with the respective coupling segments.

The respective keys 30 and 32 are dimensioned, as later discussed, for them to be received within corresponding axially spaced annular grooves 34 formed in the respective pipes adjacent the ends thereof, the respective annular grooves 34 being formed in a manner later discussed.

In use of the segmented coupling, the ends of the pipes 24 are brought into proximity with each other with the gasket 28 in sealing relationship with the pipe ends, the respective coupling segments are positioned over the gasket 28 with the gasket contained within the recess 26, and the keys 30 and 32 are inserted into the annular grooves 34 in the respective pipe ends. The bolts 20 are then inserted through the aligned apertures 18 of the coupling segments, and the coupling segments are drawn towards each other by tightening the nuts 22 down on the bolts 20. This draws the respective coupling segments towards the pipes, and compresses the gasket 28 into intimate sealing contact with the respective pipe ends.

While the respective coupling segments may be formed by any known techniques, such as by pressing or drop-forging steel or any other suitable high-strength metal, the respective coupling segments are formed by close tolerance casting techniques from ductile iron or a similar high-strength metal, and, for the reasons later discussed, intentionally left unmachined or surface finished, except for the removal of any flashings, riser cores or the like superfluous portions resulting from the casting operation.

It will be appreciated that while the segmented coupling of the present invention is being described with reference to its application in high-pressure applications, the term "high-pressure" is relative to the materials comprising the pipes, and, to the materials comprising the coupling segments. For example, in pipeline assembles which are employed for transporting abrasive or corrosive materials under pressure, either in the form of slurries or airborne suspensions of particulate material, the coupling segments similarly may be formed from nylon or any other suitable plastics material, such materials having a strength which is substantially lower than steel or ductile iron. In this context, the term "high-pressure" is used in relation to the strength of the materials employed in the fabrication of the pipeline system and the coupling segments, the term "high" being used relatively to the specific materials employed. When formed of relatively low-strength materials, the segmented couplings of the present invention are inherently capable of withstanding pressures considerably higher than those at which known segmented couplings formed from the same materials would fail.

In those instances where the coupling segments are formed from nylon or other plastics material which is inherently capable of being injection molded, that technique would be employed.

While the segmented coupling illustrated in the drawings is comprised of only two coupling segments, it will be appreciated that the invention is equally applicable to segmented couplings comprising three or more coupling segments for use in conjunction with large diameter pipes. The use of multiple coupling segments facilitates the manual handling of the segments and the assembly of the coupling onto the pipes. Additionally, the formation of such large size segmented couplings from multiple coupling segments facilitates the forming of the respective coupling segments to closer tolerances than would be possible in the case of a large segmented coupling comprised of only two coupling segments.

Figure 2:
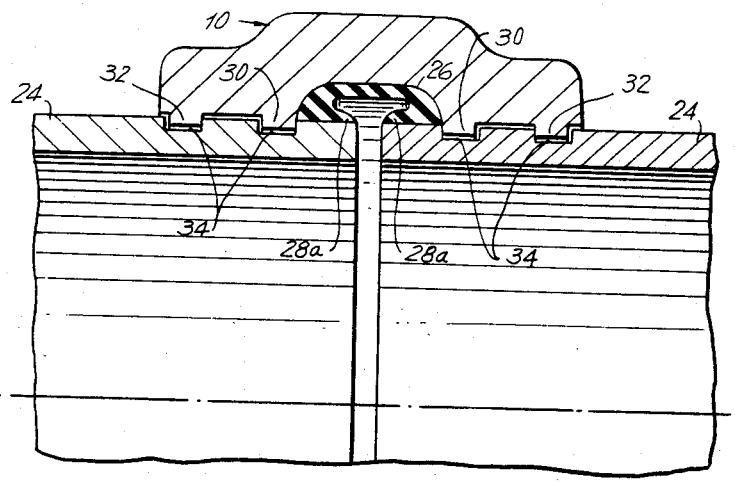
FIG. 2 is a longitudinal cross-section taken in a horizontal plane through one of the coupling segments of FIG. 1 in assembled relationship with the grooved ends of a pair of pipes.

Having generally discussed the basic construction of one form of the segmented coupling according to the present invention, reference is made to FIG. 2 of the drawings, which illustrates such segmented coupling of FIG. 1 in horizontal, longitudinal cross-section, the same reference numerals being employed in FIG. 2 as those employed in FIG. 1.

In FIG. 2, it will be noted that the gasket 28, which, by way of illustration, is of a generally U-shaped configuration, is held compressed within the recess 26 of the respective coupling segments 10 and 12 with axially-extending lips 28a, 28a of the gasket in face contact with the cylindrical lands at the ends of the pipes 24.

Preferably, and having regard to the temperature limitation imposed on gaskets formed from plastics materials, the gasket is formed from a high-strength elastomeric material, and may further be reinforced and armored to aid in eliminating extrusion of the gasket material into the spaces between the pipe and the coupling under the influence of extremely high pressure imposed thereon.

In order to further reduce the possibility of such extrusion of the gasket occurring, rather than to be offset axially relatively to the recess 26, the axially inner keys 30 constitute a continuation of the radially-extending walls of the recess 26. In this way, the possibility of extrusion of the gasket material between the axial interfaces of the coupling segments and juxtaposed surfaces of the respective pipes is eliminated.

As will be apparent from consideration of FIG. 2, the forces acting on the respective pipes will act axially of the pipes in a direction to force the pipe ends away from each other. The required restraint against such movement is provided by the segmented coupling, particularly by the engagement of the keys 30 and 32 within the grooves 34.

In known segmented couplings, the axial loading imposed on the respective pipes must be absorbed by a single key associated with each pipe end, and which is received within a single groove formed in the associated pipe end. These extremely high stresses in the keys and in the pipe ends have precluded the use of such segmented couplings in high-pressure applications. Either the keys will shear or fracture under the stresses imposed thereon, or, the pipe end will deform elastically or plastically and pull out of the coupling, or, the pipe will fail in the region of the groove under the influence of the stresses imposed thereon, or combinations thereof.

To increase the pressure handling capability of such a segmented coupling by increasing the area of surface contact between the respective keys and the associated radial walls of the pipe groove, requires an increase in the depth of the pipe groove which is self-defeating. Any increase in the depth of the grooves results in a decrease in the thickness of the pipe wall in the region of the grooves. The result is a decrease in the axial loading at which the pipe itself will fail.

In the embodiment shown in FIG. 2, each of the keys 30 and 32 is formed with that surface of the key which faces inwardly of the coupling and which is presented towards the recess 26, within tolerances, radial and perpendicular to the longitudinal axis of the coupling segment throughout the entire arcuate extent of the key. While the respective keys may be planar throughout the entire arcuate extent thereof, in some circumstances it may be preferred that this surface deviate to determined extents to one side or the other of a medial plane perpendicular to the axis of the coupling segment, the said surface of the key at all positions along the entire arcuate extent thereof lying parallel to, but possibly spaced from the said medial plane. Such deviation may be employed to compensate for possible flexing in the body of the coupling segment under high-pressure loading, and in order to optimize the distribution of stresses acting thereon.

The opposite surface of each of the keys may be selected to optimize strength and preferably is of inclined or buttressed form to facilitate entry of the keys into the associated grooves in the pipe ends.

It may further be desirable that each key be formed for it to be of maximum permissible radial extend, and may, at least under certain conditions, be in close juxtaposition or even in axial face contact with the axial bottom surface of the associated groove.

The grooves 34 in the pipes may be formed in any convenient manner, it being particularly desirable that the axial spacing of the grooves be complementary to permit simultaneous engagement of the respective keys. While in theory, such simultaneous engagement should be obtained in order to optimize the distribution of stresses on respective keys, such a condition cannot be assured in practice, due to manufacturing tolerances.

One manner of accommodating any clearance between the respective radial surfaces of the keys and the juxtaposed radial surfaces of the grooves is by casting the coupling segments and intentionally eliminating form finishing or machining operations on the radial faces of the keys. Not only does this achieve a cost advantage, but additionally, it facilitates the close contact of the keys within the grooves as the pressure within the pipes progressively increases.

As opposed to being a smooth planar surface, such as would be formed by a machining operation, the radial faces of the cast and unfinished keys are inversely pebbled, the inverse pebbling representing the grain size of the sand employed in the casting operation. Additionally, by virtue of the casting operation, it is found that a hardened skin of 0.005 to 0.01 inches in thickness forms on the coupling members during the casting operation, the hardness of the skin exceeding the hardness of the carbon steel comprising the pipes.

The radial surfaces of the keys are in engagement with the juxtaposed radial surfaces of the pipe grooves only at positions constituting high-points on the radial surfaces of the keys. As the pressure within the pipes progressively increases, the stresses exerted on the keys are absorbed exclusively by the said high-points, which, as the pressure progressively increases, act to cold-work the juxtaposed radial face of the pipe groove and displace the material of the pipe in directions laterally of the high-points, into the pockets in the radial face of the keys constituted by the said inverse pebbling. In this way, minor movement of the material of the pipe is intentionally induced, and intentionally is employed to optimize distribution of the stress applied to the respective keys.

It is found in practice that the respective coupling segments can be cast with sufficient accuracy that, when the assembled coupling is subjected to high-pressure loading, the cold-working and plastic deformation of the radial face of the pipe groove, possibly accompanied by some crushing-down of the high-points on the radial surfaces of the keys produces a substantial distribution and equalization of the stresses imposed on the respective keys.

By providing plural keys and corresponding grooves in the pipe with a combined area of surface engagement of the keys with the pipe which is equal to or greater than that provided by a single key and groove, the thickness of the pipe wall in the region of the grooves is materially increased and a significant increase in strength is achieved.

Thus, in order to obtain an equivalent area of surface contact, the reduction of the wall thickness of the pipe with the use of dual keys and dual grooves will result in a decrease in thickness of the pipe wall in the regions of the grooves of 19.82%, while a comparable single key and groove arrangement will result in a reduction in the thickness of the pipe wall in the vicinity of the groove of 40.70%.

Figure 3:
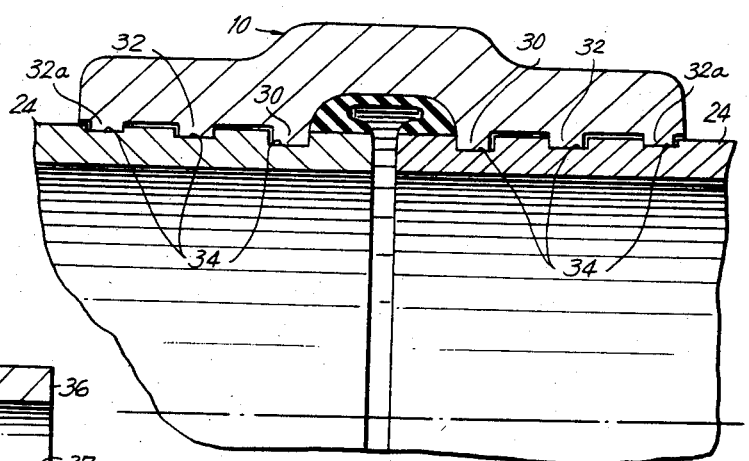
FIG. 3 is a longitudinal cross-section corresponding with FIG. 2, but showing a modification of the coupling segment of FIG. 2.

FIG. 3 illustrates an embodiment in which three keys 30, 32 and 32a are provided for engagement in three corresponding grooves 34 in each pipe end. While each of the keys may be of the same radial extent as the others of the keys, thus minimizing the required depth of the respective grooves and maximizing the wall thickness of the pipe at all vicinities in the regions of the grooves, the keys may be formed of progressively increasing radial extent progressing in this embodiment from the axial ends of the coupling segments towards the central recess 26 in the coupling segments. The grooves 34 in the pipes will then be correspondingly of progressively increasing depth towards the free end of the pipe and are in fir-tree formation. Alternatively, the outermost pair of keys 30 and 32a may be of greater radial extent than the central key 32, or vice versa.

While the discussion of the present invention as related to FIGS. 1 and 2 has dealt mainly with the manner in which forces acting axially of the respective pipes are accommodated and absorbed, it will be appreciated that in addition to such axially acting forces, radially acting forces also will be produced under high-pressure loading. While some radial expansion of the respective pipes will occur under high-pressure loading, major considerations arise in the effect of such radial expansion forces on the respective coupling segments. This aspect of the invention is now discussed with respect to FIGS. 4 and 5 of the drawings.

Figure 4:
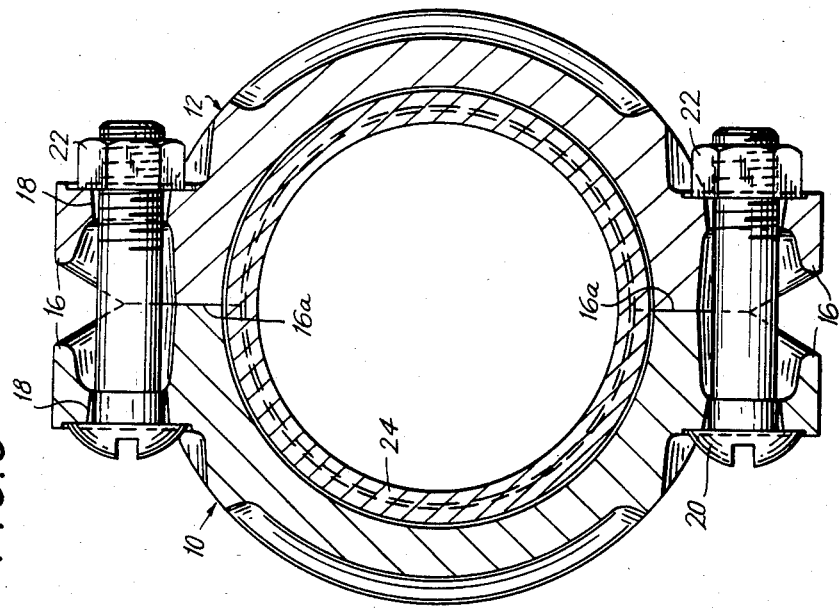
FIG. 4 is a cross-section illustrating a preferred form of the coupling segments in the position they occupy prior to final assembly of the segmented coupling.

As seen in FIG. 4, prior to the rightening down of the nuts, each coupling segment 10, 12 is of a radius slightly greater than the radius of the pipe, i.e., while the pipe 24 is of an external radius R, taken about the point B, the internal radius R1 of the respective coupling segments is slightly in excess of the radius R, and is taken about the point of B1. The respective coupling segments each subtend an arc of slightly less than 180 degrees such that when the respective coupling segments are applied to the pipe, they do not meet each other in face engagement of the radial bolting pads 16, but instead, are slightly spaced from each other. It further will be noted that prior to tightening of the bolts 20, the radially extending planar faces of the respective bolting pads diverge from each other in the radially outward direction.

Figure 5:
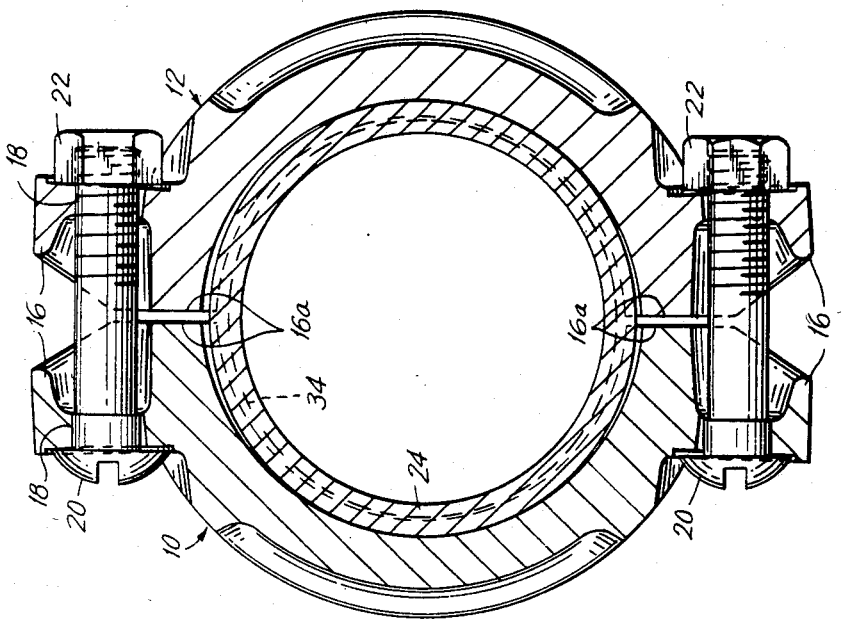
FIG. 5 is a cross-section corresponding with FIG. 4 illustrating the coupling segments in the position they assume on final assembly of the coupling.

As shown in FIG. 5, upon tightening of the bolts, the respective coupling segments flex about the center thereof, which at that time is in line or face engagement with the pipe, this resulting initially in the radially innermost portions of the radial bolting faces being brought into engagement with each other, thus trapping the gasket 28 within the coupling segments and inhibiting any possibility of extrusion of the gasket member in a radially outward direction between the juxtaposed faces of the bolting of the pads.

Continued tightening of the bolts 20 results in the juxtaposed faces of the bolting pads being drawn towards and rotated slightly into face contact with each other, thus pre-stressing the bolt of the respective coupling segments. This pre-stressing of the respective coupling segments acts in opposition to the forces acting to expand the coupling segments in a radial direction, and also, acts in opposition to the forces exerted on the respective pipes and which act to expand the pipes in a radial direction.

While a segmented coupling has been described for coupling the adjacent ends of a pair of pipes to each other, it will be appreciated that the segmented coupling of the present invention also finds application in a flanged coupling for connecting a single pipe to some other member, such as the flanged outlet coupling of a high-pressure pump.

Figure 6:
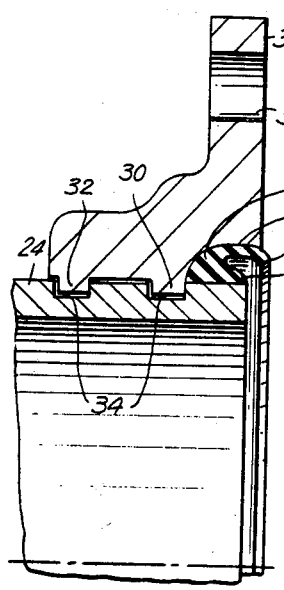
FIG. 6 is a longitudinal cross-section corresponding with FIG. 2, but showing a flanged segmented coupling according to the present invention.

FIG. 6 of the drawings illustrates such a flanged segmented coupling incorporating dual keys as described above with reference to FIG. 2, the same reference numerals being used in FIG. 6 to identify those integers which are in common with FIG. 2.

In FIG. 6, the respective coupling segments extend to only one side of the gasket containing recess 26, and, each of the coupling segments includes a radially extending flange 36 provided with appropriate bolt holes 37. The gasket 38, represents one half of the gasket 28 previously described, and includes an axially extending lip 38a for engagement with the land at the end of the pipe 24, the gasket including a continuous circumferential lip 40 for engagement with a planar surface of the member to which the segmented coupling is to be attached.

While the invention has been described with reference to segmented couplings for use with standard grooved pipe, the invention has equal utility in segmented couplings for use in other applications, as will be evident from the following description with reference to FIGS. 7 through 11, in which the same reference numerals are used to identify those integers which are in common with the previously described embodiments.

Figure 7:
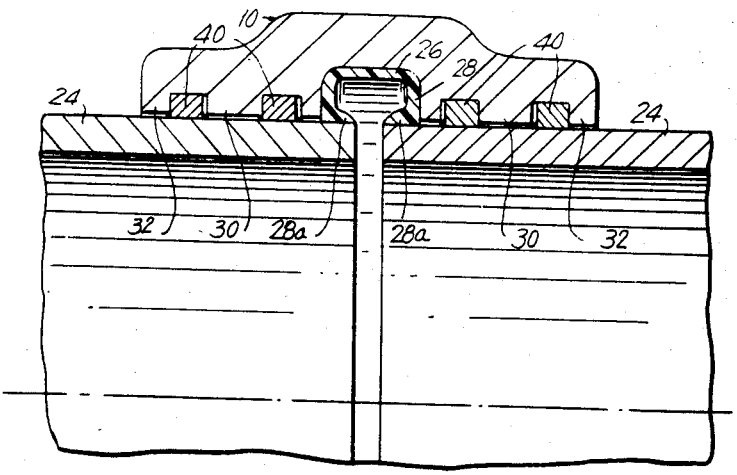
FIG. 7 is a longitudinal cross-section corresponding with FIG. 2 of an alternative form of coupling segment.

In FIG. 7 there is shown a transverse cross-section through a coupling segment for use with plain-ended pipe, which, by virtue of the elimination of the grooving thereof, may either be standard pipe, or, may be steel or stainless steel thin wall pipe. For the purpose of convenience, in FIG. 7 the pipe has been shown as standard pipe, it being understood that thin wall pipe could be substituted therefor.

Figure 8:
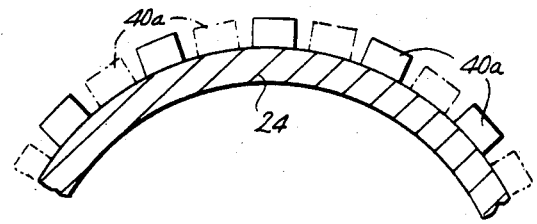
FIG. 8 is a fragmentary end elevation of an alternative form of pipe end prepared for reception of the coupling of FIG. 7.

In FIG. 7 the required abutment members 40 for engagement by the keys 30 and 32 of the coupling segment 10 are comprised by continuous rings which have been welded or otherwise secured to the outer periphery of the pipe in any known manner. In the case, more particularly, of thin wall pipe, the abutment members 40 may be provided by bead rolling the pipe from the interior thereof using adaptations of the machines disclosed in U.S. Pat. Nos. 3,903,722, Thau, Jr. et al, issued Sept. 9, 1975. or in 3,995,466, Kunsman, issued Dec. 7, 1976. Alternatively, instead of providing continuous roll beads on the exterior of the pipe, a plurality of arcuate radially-extending abutment members may be formed thereon employing the apparatus disclosed and claimed in U.S. patent application Ser. No. 368,010 Gibb et al, filed Apr. 13, 1982 now U.S. Pat. No. 4,470,291. Alternatively, and as is illustrated in FIG. 8, the abutment members may be comprised by studs 40a welded or otherwise secured to the outer periphery of the pipe, the studs of the abutment members for engagement by the respective keys either being arranged axially in line with each other, or, in staggered or overlapping relationship in an axial direction as indicated in chain-dotted lines in FIG. 8.

Figure 9:
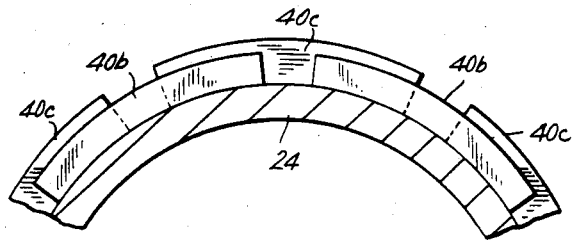
FIG. 9 is a fragmentary end elevation of an alternative form of pipe end prepared for reception of the coupling of FIG. 7.

Alternatively, and as is illustrated in FIG. 9, the respective abutment members may be formed of arcuate segments welded or otherwise attached to the pipe periphery as shown at 40b, and, the arcuate abutment members of the respective abutments may be arranged in circumferentially spaced relationship and staggered relatively to the abutment members 40c of the next adjacent abutment, and, if required, the respective arcuate segments 40b and 40c may be of different radial extent to each other, as illustrated in FIG. 9, in the manner discussed previously with respect to FIG. 3.

Figure 10:
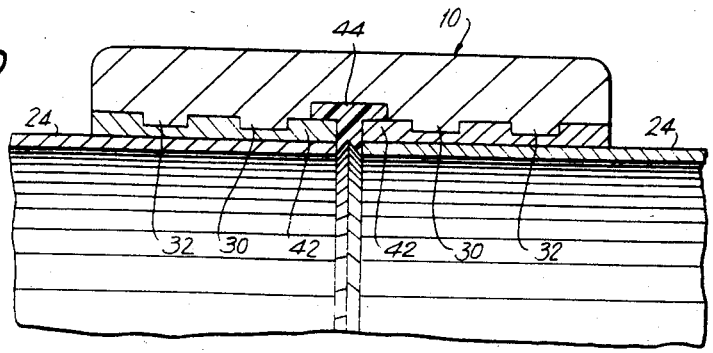
FIG. 10 is a longitudinal cross section corresponding with FIG. 2 of another alternative form of coupling segment.

In FIG. 10 there is shown a coupling segment particularly adapted for use with either thin wall metal pipe or, plastic pipe. While in FIG. 10 the respective members have been indicated as being formed of metal, it will be understood that the respective members equally well could be formed from plastics material such as illustrated in FIG. 11.

In FIG. 10, the respective pipes 24 each are provided with a grooved collar 42 which is welded or brazed to the pipe in known manner, or, which in the case of a plastic pipe is cemented or heat fused to the pipe end in known manner. By forming the respective grooves for reception of the keys 30 and 32 within the collar 42, the integrity of the pipes 24 is maintained and the necessity of grooving or beading the pipes is eliminated. In FIG. 10, there is illustrated a modified form of gasket 44 of generally T-shaped cross-section which is held compressed against the ends of the collars 42 by the respective coupling segments.

Figure 11:
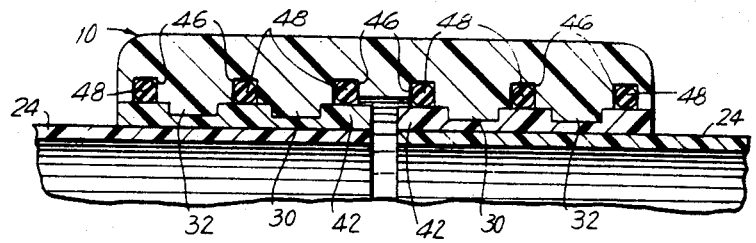
FIG. 11 is a longitudinal cross-section corresponding with FIG. 2 of still another alternative form of coupling segment.

As an alternative to the provision of a centrally located gasket, such as the gaskets 28 or 44, the respective coupling segments can be internally grooved as illustrated at 46 in FIG. 11, and contain O-rings to be positioned over the respective lands of the collar 42 on each side of the grooves receiving the keys 30 and 32. In FIG. 11 the respective integers have been illustrated as formed of plastics material. The respective integers, with the exception of the O-rings 48, equally well could be formed from metal. Where O-rings are employed, it may be desirable to provide additional sealing means between mated faces of the segments.

Coupling members of the type illustrated in FIGS. 10 and 11 find particular application in either thin-wall metal pipe systems or plastic pipe systems employed for conveying slurries or airborne particulate materials. In such systems, owing to deviations produces in the fluid flow, and possibly eddy currents which occur at the adjacent ends of the pipes, there is a tendency for the pipes to abrade more rapidly in the vicinity of the coupling, with a progressive decrease in the thickness of the pipe wall. In such applications, the provision of the grooved sleeve 42 reinforces the pipes in these positions of accelerated wear, thus extending the useful life of the piping system.

Figure 12:
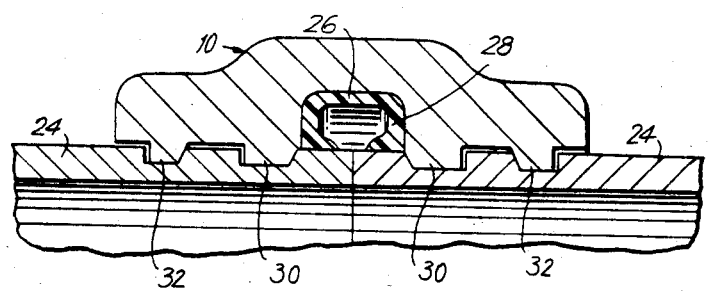
FIG. 12 is a longitudinal cross-section corresponding with FIG. 2 of yet another alternative embodiment of coupling segment.

In some applications, it is desired that a minimum of discontinuity be incurred at the juncture between the pipe ends, and, that the pipe ends be brought into intimate abutting relationship with each other. An adaptation of the segmented coupling of the present invention to such requirements is illustrated in FIG. 12 of the drawings, in which the respective keys 30 and 32 are provided with inclined radial faces, and, the pipe is grooved to provide corresponding inclined abutment surfaces. In this embodiment, upon tightening of the segmented coupling about the pipe ends, the respective keys 30 and 32 force the respective pipes 24 axially towards each other to bring the radial end faces of the pipes into the required abutting engagement.

While the coupling segments so far described each have been of generally arcuate configuration, it will be appreciated that the external configuration of the respective coupling segments is of no particular consequence provided that they provide, in combination, the required encircling relationship with the pipe and maintain the respective keys in proper orientation within the grooves associated with the keys.

Additionally, while in each of the embodiments so far described, the respective keys have been formed integrally with the respective coupling segments, it will be understood that the respective keys could be formed separately and positioned in appropriate recesses in the coupling segments subsequent to the manufacture thereof, or, be incorporated into the coupling segments by virtue of the segments being cast or otherwise formed around the keys, with the keys in situ. Two such examples are shown in FIGS. 13 and 14 of the drawings.

Figure 13:
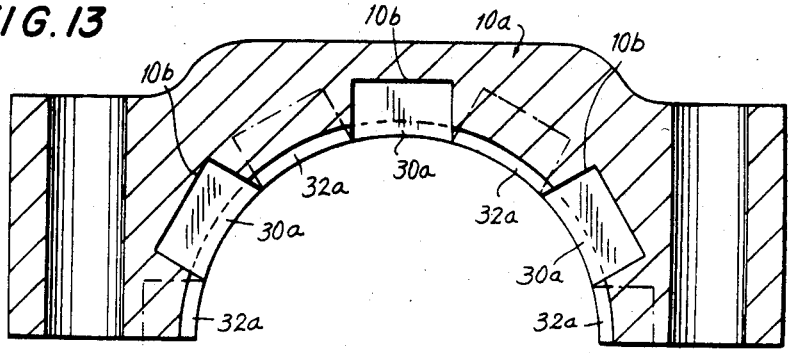
FIG. 13 is a transverse cross-section generally corresponding with FIG. 4 of another alternative form of coupling segment; and, FIG. 14 is a transverse cross-section generally corresponding with FIG. 4 of still another form of coupling segment.
Figure 14:
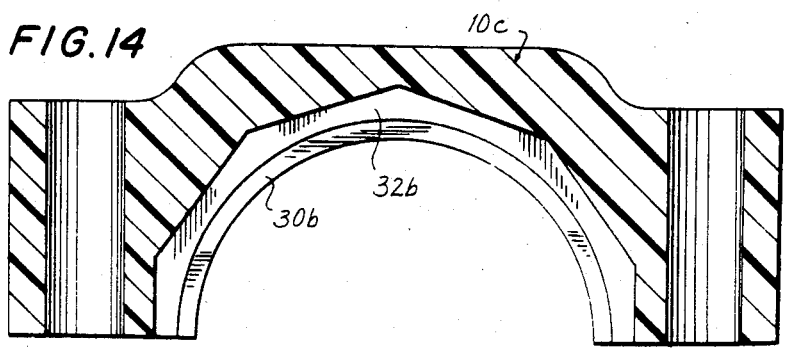

In FIG. 13 the body 10a of the coupling segment is cast or otherwise formed with recesses 10b for the reception of keys 30a, or alternatively, the keys 30a are positioned within the mold, and the body of the coupling segment 10a is cast around the keys with the keys in situ. In the case of FIG. 14, which illustrates a molded coupling segment 10c formed from a plastics material, the body of the coupling segment is formed either with grooves for the reception of metal keys 30b and 32b, which, for convenience, are shown of different internal radius, or, the keys 30b and 32b are positioned in the mold prior to the injection molding of the body of the coupling segment, and are thus molded in situ. In such an application, clearly it is undesirable for the segmented coupling to be capable of rotating relatively to the keys. Such rotation readily can be prevented by forming the outer periphery of the keys for them to be other than arcuate, for example, they can be formed with their outer periphery of polygonal or other form.

Various additional modification of the preferred embodiments of the segmented coupling described above can be made without departing from the scope of the appended claims, and, various materials may be substituted for those disclosed, depending on the specific application and intended use of the segmented coupling, again without departing from the scope of the appended claims, the description above with respect to the several embodiments of the invention being by way of example only as to preferred embodiments of the invention.

What is claimed is:

1. In combination:
   a conduit member of a conduit system;
   said conduit member having plural axially spaced key receiving engagement members adjacent at least one end thereof, each said engagement member being formed of ductile material;
   a segmented coupling embracing and secured to said end of said conduit member, said coupling including:
   plural arcuate members each providing an internal recess, each said member being comprised of a substantially unfinished high-strength casting of a material having substantial ductility, at least one portion of each said arcuate member extending axially to one side of said internal recess;
   a gasket positioned within said recess;
   securing means securing said arcuate members in encircling engagement with said conduit member, with said gasket in continuous sealing engagement with said one end of said conduit member; and,
   plural axially spaced continuous arcuate keys integral with and extending inwardly of the inner periphery of said axially extending portion of each said arcuate member;
   said keys respectively being spaced axially correspondingly with said engagement members of said conduit member and each being engaged with the engagement face of a said engagement member, said keys resisting relative axial movement between said coupling and said conduit member when under axial loading;
   each said key having a substantially unfinished engagement face having an inversely pebbled surface produced in the casting of the associated segment and which faces towards said internal recess, and, which is engaged with a radially extending engagement face of an associated engagement member, said engagement faces of said keys and said engagement members lying substantially radial and perpendicular to the axis of generation of the associated arcuate member, said inversely pebbled surface of said engagement face of each said key being capable of crushing down and cold working the associated engagement member of said conduit member, to provide substantially uniform distribution of the stresses imposed upon said keys when said keys are subjected to axial loading.

2. The combination of claim 1, in which said engagement members are defined by grooves formed in the outer periphery of said conduit member.

3. The combination of claim 1, in which said engagement members are provided by attachments secured to the outer periphery of said conduit member.

4. A piping system, comprising in combination:
   plural lengths of pipe arranged in axially aligned relationship, each said pipe having axially spaced key engagement members adjacent the ends thereof;
   at least one conduit member providing transitions between respective said pipes, each said conduit member having axially spaced key engagement members adjacent the ends thereof;
   said key engagement members each being comprised of a ductile material; and
   plural segmented couplings embracing and secured to adjacent ends of said pipes and conduit members, each said coupling including:
   plural arcuate members each having an internal recess and each comprised of a substantially unfinished high-strength casting of a material having substantial ductility;
   a gasket positioned within said recess;
   securing means securing said arcuate members in encircling engagement with said pipes and conduit members, with said gasket in continuous sealing engagement with the ends of said pipes and said conduit members; and, plural axially spaced continuous arcuate keys integral with and extending inwardly of the inner periphery of each said arcuate member;

said keys respectively being spaced axially correspondingly with said axially spaced engagement members of said pipes and said conduit members, and each being engaged with an engagement face of a said engagement members of said pipes and coupling members, said keys resisting relative axial movement between said pipes and said coupling members when said piping system is subjected to pressure loading;

each said key having an unfinished engagement face produced in the casting thereof having an inversely pebbled surface which is engaged with a said engagement member;

said engagement faces of said keys and said engagement members lying substantially radial and perpendicular to the axis of generation of the associated arcuate member;

said inversely pebbled surface of each said key being capable of crushing down and cold working the juxtaposed radial face of the associated engagement member, to provide substantially uniform distribution of the stresses imposed upon said keys when said keys are subjected to axial loading.

5. The system of claim 4, in which said engagement members are defined by grooves formed in the outer periphery of said pipes and conduit members.

6. The system of claim 4, in which said engagement members are attachments secured to the outer periphery of said pipes and said conduit members.

7. A method of providing stress equilization in interconnections between conduit members of a conduit system when subjected to internal pressure loading, comprising the steps of:

providing said conduit members with plural axially spaced engagement members adjacent to the ends thereof, and which each provide radially extending engagement faces, each said engagement member being comprised of a material of substantial ductility that is plastically deformable;

arranging said conduit members with ends thereof in axial alignment with ends of adjacent conduit members;

providing segmented couplings clamping adjacent ends of adjacent coupling members to each other;

providing each said coupling with plural keys each having a radially extending engagement face for engagement with a said radially extending engagement face of said engagement members, and positioning said keys with said respective engagement faces of said keys and said engagement members in juxtaposition with each other;

forming the segments of each said segmented coupling and the keys thereof as unitary substantially unfinished high-strength castings of a material having substantial ductility, and in which the radial faces of said keys, at least, have an inversely pebbled surface produced in the casting of said segments; and subjecting said conduit members and said couplings to oppositely acting axial loading forces to cause the inversely pebbled surface of the radial engagement faces of said keys to crush down and to cold work the juxtaposed radially extending engagement face of the juxtaposed engagement member, and to progressively produce substantially uniform distribution of the stresses imposed on the respective keys by progressive crushing down of said pebbled surfaces of said keys and cold working of the material comprising said engagement members.

8. The method of claim 7, including the steps of providing said engagement members by forming plural grooves adjacent the ends of said conduit members, each providing a radially extending engagement face.

9. The method of claim 7, including the steps of attaching engagement members to the outer circumference of said conduit members, each said engagement member providing a radially extending engagement face.

10. A method of assembling a conduit system including the steps of:

securing adjacent ends of conduit members to each other, each said conduit member having axially spaced radially extending plastically deformable engagement faces adjacent the ends of said conduit members, by applying a segmented coupling to the adjacent ends of said conduit members, each said coupling including plural radially extending keys of high strength material of substantial ductility and with a substantially unfinished inversely pebbled surface thereon produced in the casting of respective segments of said coupling; and, pressurizing said conduit system to produce axial stressing of said key engagement faces of said conduit members and crushing down said pebbled surfaces of said keys to cold work the material of said engagement faces, to equalize the compressive loads exerted on the respective keys and engagement faces, and, thus accommodate dimensional variations in the axial positioning of the respective said keys and engagement faces.

* * * * *